May 30, 1961 W. J. FRY 2,986,227
ACOUSTIC WAVE MEASURING METHOD AND APPARATUS
Filed May 2, 1955 2 Sheets-Sheet 1
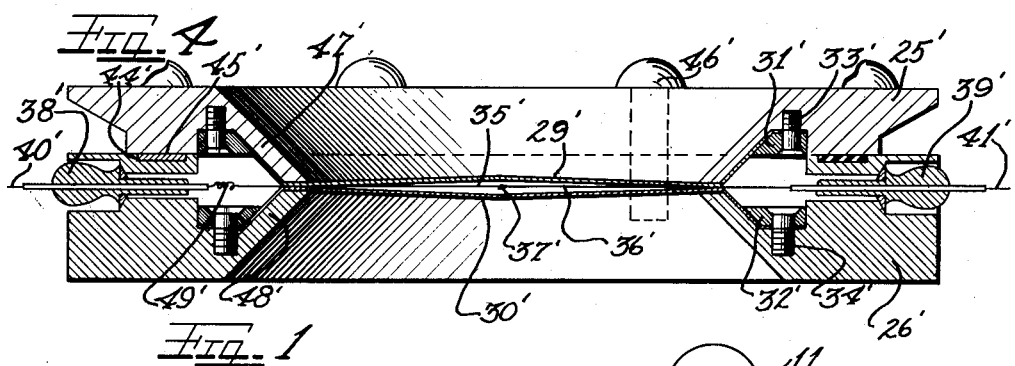
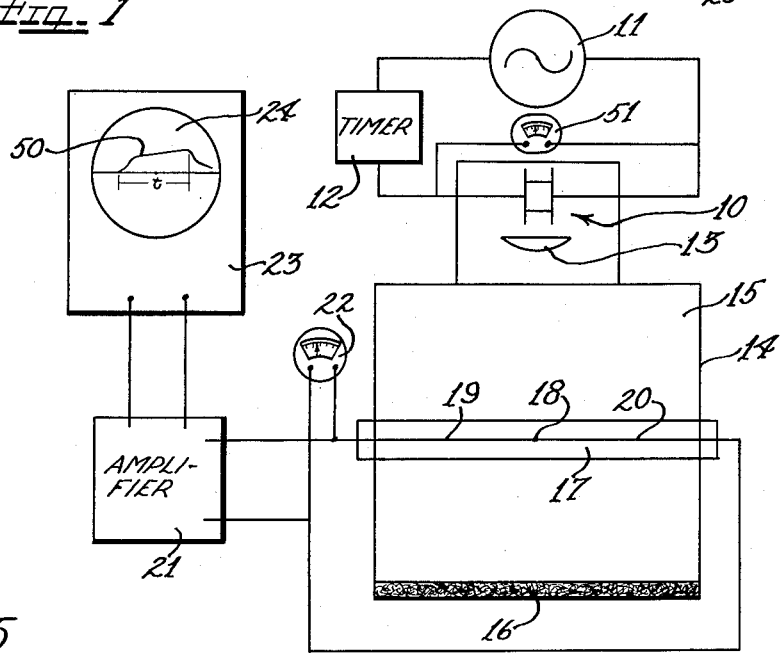
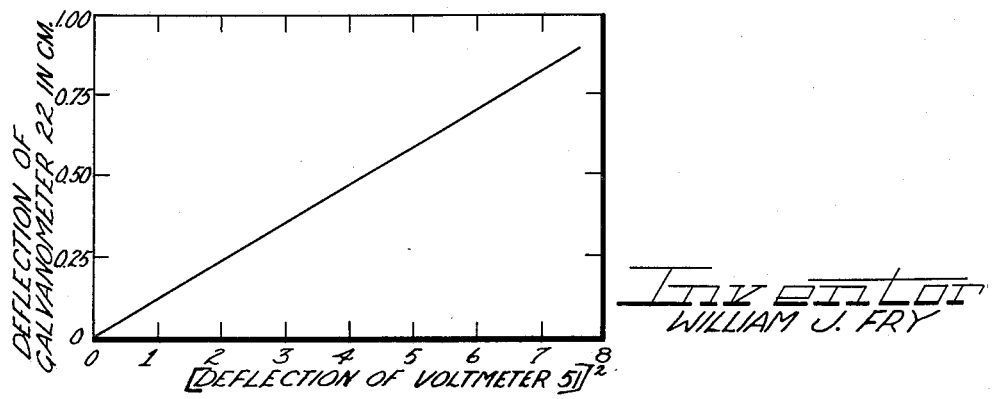
Inventor
WILLIAM J. FRY Inventor
WILLIAM J. FRY

2,986,227
ACOUSTIC WAVE MEASURING METHOD AND APPARATUS

William J. Fry, Urbana, Ill., assignor to University of Illinois Foundation

Filed May 2, 1955, Ser. No. 505,365

6 Claims. (Cl. 181—.5)

The present invention relates to measuring methods and apparatus and more particularly to a method and apparatus for measuring the intensity and field pattern of acoustic wave energy.

With the advent of acoustic irradiators and their developed importance in various fields and the increase in the use thereof, it has become highly important and desirable to find means and processes for measuring the intensity of the radiated acoustic wave energy and the field pattern thereof, particularly where the irradiated energy is focused. Several methods and apparatus have been developed, such as the radiation pressure evaluation method and the equilibrium temperature rise apparatus and method. In the equilibrium temperature method a steady or constant temperature state (also frequently termed "thermal equilibrium") must be reached before any measurements can be made. None of these older methods have been as satisfactory as is desirable since they are either too complex and time-consuming or inaccurate, or inherently incapable of being utilized to determine fine detail in field patterns. For example, the results obtained with equilibrium temperature rise type probes are critically dependent on the geometry and size of the device and, in addition, these probes usually have such bulk at the thermal junction that they may have dimensions greater than a wavelength or an appreciable fraction of the wave length of the energy, in many instances, and therefore cannot be used to determine field patterns accurately. This is also true of the crystal and ceramic type probes since the smallest practically useful size thereof is about one millimeter in a linear dimension of the cross-section.

Another great difficulty with the equilibrium temperature rise type of measuring method for acoustic irradiators lies in the inaccuracy thereof for different field distributions since it is only practical to calibrate such probes for one, or at most a few fields of known distribution, and these calibrations are not accurately applicable for arbitrary acoustic field distributions.

Measurement of sound fields, in order to determine the intensity and/or other characteristics thereof, in accordance with the principles of the present invention, is based upon an entirely different concept than that of equilibrium temperature rise. In accordance with the present invention, a sound wave is pulsed on and the temperature change at the probe is measured either as a function of time or after a predetermined time interval. This is done considerably prior to the time required for close approach to thermal equilibrium or steady state. From this change of temperature at the probe, the actual acoustic intensity or other characteristics of the field may be determined. On the other hand, if the field is of a known level, the acoustic absorption coefficient of the embedding medium may be determined in substantially the same manner.

Also, thermal probes can be constructed in accordance with the principles of the present invention so that they are not sensitive to geometry and therefore may be utilized for the purposes of determining acoustic field distributions of a wide variety of types.

Probes embodying the principles of this invention may take the form of very fine thermocouples such as butt or slightly lap-welded or soldered wires such as copper and constantan (forming the thermocouple), each having a diameter of, for example, about 0.0005 inch, and embedded in a sound-absorbing medium which closely matches the acoustic characteristics of the medium which conducts the sound from the irradiator and to and from the probe. The thermocouple and the surrounding absorbing medium are enclosed in a housing having windows of, for example, thin (0.003 inch) polyethylene diaphragms. When this complete probe is placed in an acoustic field, after a fixed or selected interval the thermal junction will be heated to a value which may be detected to determine the absolute sound intensity. The temperature rise at the thermocouple immediately after initiation of the acoustic disturbance is separable into two different components; one component being the result of the action of the viscous forces between the wires of the thermocouple and the embedding fluid medium, and the other resulting from the absorption of sound wave energy in the absorbing medium. These two components are readily separable and the component resulting from absorption is utilized in the determination of the absolute acoustic intensity or the intensity of the wave energy. By detecting the temperature rise as a function of time, for the component resulting from absorption, the absolute sound intensity may, for example in the case of a plane wave, be determined in accordance with the law:

$$uI = pC(dT/dt)$$

wherein the acoustic envelope is rectangular and $u$ designates the acoustic intensity absorption coefficient (per unit path length) of the embedding medium, $I$ represents the acoustic intensity, the product $pC$ designates the heat capacity of an embedding fluid per unit volume and $(dT/dt)$ indicates the time rate of change of the temperature of the embedding medium at the time of initiation of an acoustic disturbance, the acoustic disturbance having a substantially rectangular envelope. At a specific site or position in a sound field the time rate of change of the temperature, resulting from absorption in the medium in response to an acoustic pulse, can be expressed in terms of the acoustic pressure-amplitude at that site. From the measured value of the time rate of change of the temperature rise, $dT/dt$, or the value of the temperature after a selected time interval, the value of the acoustic pressure-amplitude at the position in the medium at which the junction is placed can be determined. To perform this determination the acoustic absorption and coefficient (for example, pressure absorption coefficient) per unit path length and the heat capacity per unit volume of the imbedding fluid must be known, in addition to the detected time rate of temperature rise or the value of the temperature after a selected time interval.

The component resulting from viscous force action may also be used in determining characteristics of acoustic fields. It is especially useful in determining field distributions since short acoustic pulses can result in reasonable temperature rises followed by a relatively rapid approach to the initial state after cessation of the acoustic disturbance.

Thermal probes operated in this manner and constructed as described hereinabove and described in great detail hereinbelow are most advantageous and provide an important improvement over the prior art for the reasons already given and for the further reasons that the sensitive elements of probes are small in size, are stable, may be used as primary standards for absolute sound level measurements, are insensitive to stray fields, and have a low input electrical impedance.

Thus, it is an important object and feature of the present invention to provide a new and improved method of determining radiated acoustic energy levels and acoustic field distribution by detecting the change of temperature, as referenced against time, or at a selected time after initiating an acoustic disturbance by a temperature-sensitive element.

Still another object of the present invention is to provide a new and improved process of determining acoustic wave intensity and field distributions by detecting the change of temperature with respect to time or the temperature rise after a selected time interval in a temperature-sensitive element and, for example, from the determination of the rate of change of temperature with respect to time, determining the absolute sound level.

Another object of the present invention is to provide new and improved thermosensing means to effect a determination of absolute sound levels and field distribution for irradiators producing acoustic waves.

Still another object of the invention is to provide a thermal probe operable to determine acoustic energy intensity and to provide a method of establishing the absolute level of acoustic energy in a field thereof. Another object of the present invention is to provide a new and improved thermo probe operable to establish the acoustic pressure amplitude and the acoustic particle velocity amplitude at selected signals in an acoustic field.

Still another object of the present invention is to provide a new and improved thermal probe comprising essentially a sound-absorbing medium and a thermocouple of relatively small dimensions with respect to the wave length of radiated acoustic energy to be measured.

Still other objects, features and advantages of the present invention will become readily apparent from the following detailed description of the present invention and an embodiment thereof, from the claims and from the accompanying drawings in which each and every detail shown is fully and completely disclosed, in which like reference numerals refer to like parts, and in which:

Figure 1 is a more or less schematic and diagrammatic illustration of an acoustic wave-generating, transmitting and measuring system utilizing the principles of the present invention;

Figure 4 is a sectional view like Figure 3 but of a modified form of probe embodying the principles of the present invention; and Figure 5 is an idealized graph of galvanometer deflection in centimeters which is proportional to the probe temperature change versus transducer exciting voltage squared (for a linear transducer).

Figure 2:
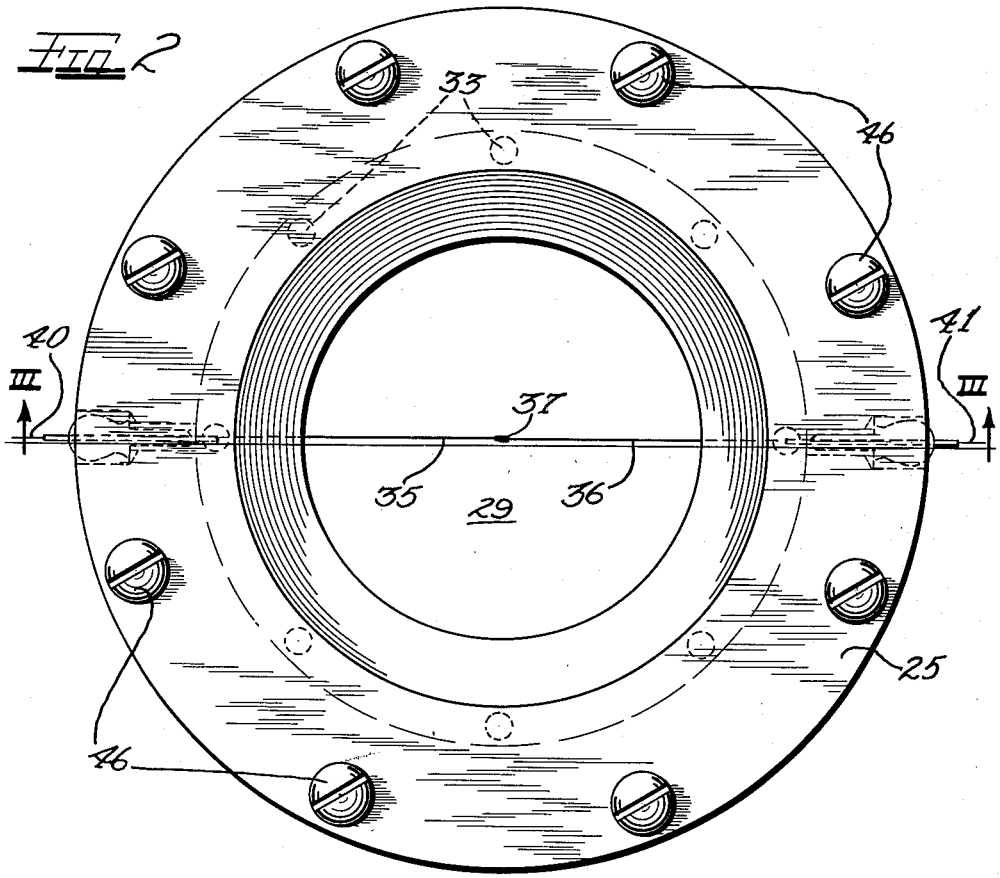
Figure 2 is a plan view of a probe embodying the principles of the present invention.

There is illustrated in Figure 1 by way of example a system for determining absolute sound levels and acoustic field distribution set up in water, various salt solutions or other liquids. In the figure the irradiator 10 is energized through a potential source 11 in series with a timing mechanism 12, and functions to radiate an acoustic signal of, for example, about 1 megacycle per second or in the megacycle region of the frequency spectrum. The irradiator can also be of the focusing type so that the acoustic energy therefrom will be focused in a beam as diagrammatically indicated by a lens 13. The radiated energy is then directed into a tank 14 of water or a salt solution or other liquid 15 and at the opposite end of the tank 14 from the irradiator 10 there may be provided an absorbing medium 16 so that there will be substantially no reflection from that end of the tank 14.

Within the tank 14 there is disposed a thermal probe 17 which includes a thermocouple junction 18 with leads 19 and 20. These leads extend to without the probe 17 and may be connected to an amplifier 21 or the like and/or to a deflection galvanometer or other indicating device 22 which may provide for visual or photographic recording of a trace. The amplifier is in turn connected to an oscilloscope or like indicating device 23 having a viewing screen 24 for visual or photographic recording of the deflected spot traced by the electron beam on the screen of the cathode ray tube of the oscilloscope. For actual determination of an acoustic field distribution, it is only necessary to observe total deflection on the vertical axis. The probe may have innumerable physical variations therein in that it may be round, as viewed in Figure 2, or it may be relatively elongated to a pencil shape in the event that space is at a premium, or it may have any other of innumerable configurations as desired. In the embodiment shown, however, the probe has a pair of housing members or rings 25 and 26 (Figures 2 and 3) which, when used in a salt solution, would be stainless steel or the like but which may be formed of any material that is rigid and insoluble or corrosion resistant in the solution 15 in the tank 14 of Figure 1. These rings 25 and 26 are formed with an enlarged substantially axial aperture, 27 and 28 repsectively, provided with slanted walls and sealed closed by a pair of sound-transmitting and substantially non-reflecting diaphragms 29 and 30, respectively. For reasons given hereinafter, these diaphragms 29 and 30 may be of such material as thin polyethylene or the like. The covering of the apertures 27 and 28 by the diaphragms is effected by clamping the diaphragms within the rings by clamping rings 31 and 32, respectively, fitted into appropriately shaped annular grooves on the inner faces of the rings 25 and 26. Screw members such as screws 33—33 and 34—34 extending through the clamping rings 31 and 32, respectively, and threadably engaging the rings or housing members 25 and 26, respectively, clamp the diaphragms 29 and 30 and the clamping rings 31 and 32 firmly against the groove faces of the clamping grooves in the housing members 25 and 26.

A thermocouple consisting of a pair of dissimilar materials, for example, wires 35 and 36, having a junction 37 which may be lap or butt welded or soldered, is mounted on one of the housing rings 26 and fixed in place therein inwardly of the diaphragm 30 and with the junction 37 substantially aligned with the axis of the ring 26 by mounting the same in a pair of sealing members such as Kovar glass seals 38 and 39. This may be effected by soldering the wires 35 and 36, respectively, in the seals 38 and 39 after passing the lead ends 40 and 41, respectively through the seals. The seal members 38 and 39 are soldered or the like in appropriately countersunk recesses 42 and 43, respectively, extending radially through the ring 26. Herein it is to be noted that the thermocouple wires 35 and 36 and the junction thereof 37 correspond to the thermocouple wires 19 and 20 and the junction thereof 18 in Figure 1.

Along the inner face of the housing ring 26 there is provided an annular groove 44 which is filled with a sealing member such as a fluid sealing gasket or the like 45 and the ring 25 is then seated thereon and clamped to the ring 26 by such means as screws or bolts or the like 46—46. At the same time, the space enclosed by the two rings and their respective diaphragms is filled with a sound-absorbing medium having substantially the same acoustic characteristics (such as density and sound velocity) as the water, salt solution or other liquid in the tank, and in the present instance, as an example, may be castor oil or the like which closely matches a salt water solution in density and sound velocity.

Figure 3:
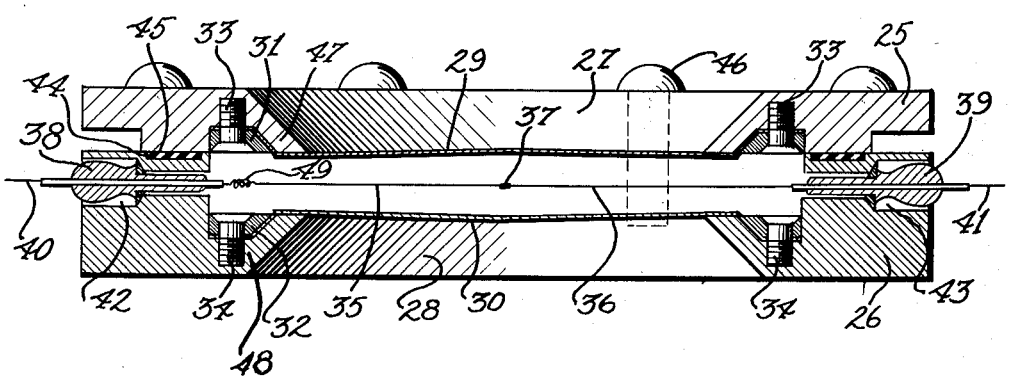
Figure 3 is a sectional view of the probe of Figure 2 and viewed substantially as taken along the line III—III of Figure 2.

In the embodiment of the invention illustrated in Figure 4, the probe is very similar to that of Figure 3, and the construction thereof is substantially identical thereto. In this instance, however, the probe has been constructed with a substantially smaller spacing between the diaphragms 29' and 30' by extending the angular arms 47' and 48' over which the diaphragms 29' and 30' pass, a greater distance towards the plane center of the probe, in which plane center lies the thermocouple wires 35' and 36' with their junction 37'. It is noted that in the embodiment of Figures 2 and 3, the arms 47 and 48 have extremities spaced a greater distance from the plane center of the probe, in which plane lies the thermocouple wires 35 and 36 with their junction 37. Otherwise, the rings 25' and 26' are substantially identical to the rings 25 and 26, as are the clamping rings 31' and 32' with their appropriate clamping screws 33' and 34'. Also, the seals 38' and 39' are like the seals 38 and 39 and are soldered in place in the ring 26' and to the lead wires 40' and 41' extending from the thermocouple wires 35' and 36'. In addition, a fluid seal 45' is disposed between the rings 25' and 26' and in a seal groove or gasket groove 44' and the two housing rings are held together by such convenient means as screws 46' or the like.

An additional and important feature of the present invention lies in the resilient mounting of the thermocouple so that these very thin and fragile thermocouple wires will not break under the stresses of acoustic vibrations or other mechanical shocks. To this end, the wires, 35 and 35' in the two embodiments shown herein, have a part thereof coiled for tension resilience, as at 49 and 49' immediately adjacent to and inwardly from the seals 38 and 38'. Thus there is provided a temperature sensitive or thermal probe device which is quite sturdy and stable and which has an extremely small thermocouple junction for operation in accordance with the methods and apparatus principles of this invention.

With reference now to the system illustrated in Figure 1, the probe is oriented in such a manner that the direction of propagation of the sound is at an angle of approximately 90° with respect to the direction of the wire of the thermocouple and the plane of the probe assembly. This direction of propagation is desirable since the metal wires, under certain conditions and configurations and wire sizes, may conduct sound to the region of the junction. This effect has been observed only in a narrow range of angles of incidence which are considerably different from normal incidence and the 90° orientation eliminates such a possible source of difficulty.

As explained hereinbefore, when the irradiator 10 of Figure 1 is energized heating of the thermocouple in the probe occurs principally from two sources; one of which is the action of the viscous forces between the wires of the thermocouple and the embedding medium, and the other of which results from absorption of the sound energy in the absorbing medium itself. In accordance with this invention, however, the irradiator 10 is energized for a relatively short period, such as 1 second, and the temperature rise in the thermocouple junction 18 is recorded either visually on the oscilloscope screen 24 or photographically or otherwise on a pen recorder type galvanometer such as the galvanometer 22. The temperature change, over the exemplified 1 second time interval for a pulse of sound with a rectangular envelope, at the thermocouple junction 18 will have a shape such as that indicated at 50 in Figure 1. A relatively rapid rise occurs just after initiation of the acoustic disturbance and this is followed by an almost linear rise for the remainder of the pulse. After cessation of the sound, a rapid fall in temperature occurs followed by a slower return of the temperature to its value preceding the acoustic disturbance. The initial rapid increase in temperature results from the conversion of acoustic energy into heat by the viscous forces acting between the wire and the embedding medium. This phase of the temperature variation approaches equilibrium rapidly. The second phase of the temperature sequence, namely the almost linear part thereof, is caused by absorption of the sound (rectangular envelope) in the body of the fluid medium; and the closeness of the approach of this phase to linearity during radiation is dependent upon the acoustic pressure amplitude generally and in more particular cases such as that of a plane wave upon the accoustic intensity, the form of the variation of the acoustic absorption coefficient of the embedding medium with temperature, the heat conductivity coefficients of the fluids and the wires, the duration of the acoustic disturbance and the acoustic field distribution. With probes embodying the principles of the present invention, this second phase permits establishing the absolute acoustic pressure amplitude in general and sound intensity in specific cases, such as plane wave fields if hte acoustic absorption coefficient of the embedding medium is known.

On the other hand, if the absolute sound pressure amplitude or intensity in specific cases is known then the acoustic absorption coefficient can be determined or established.

The relatively rapid decrease in the temperature immediately following termination of the period of irradiaton results from the removal of the viscous force mechanism which contributed a heat source confined to the immediate neighborhood of the wire and the subsequent slow phase of decline in the temperature as a consequence of the cooling of the embedding medium previously heated by absorption of the body of the medium.

Another feature of this type of probe which follows from the foregoing description thereof and of the phases of the response curve is that the recorded response curve to a single acoustic pulse in a single location may also be used to determine the acoustic pressure amplitude and also the magnitude of the particle velocity if the direction of the velocity is known and if the first phase of the response characteristic has been previously related quantitatively to particle velocity by experimental measurement in a pure traveling wave field.

In a probe such as herein described having a castor oil embedding medium and with the tank filled with a salt water solution, the castor oil and the water densities differ only by about 3% and the acoustic velocities differ only by about 1½% so that the intensity of the plane ultrasonic wave reflected at normal incidence from a water-castor oil boundary is thus of the order of about 0.05% of the incident intensity if the frequency is low enough so that viscous forces are not of primary importance in determining the reflection coefficient as is the case for castor oil-water boundary at a frequency of about 1 megacycle.

The basic relation for determining absolute sound intensity for example, in a plane wave field or rectangular time-to-temperature envelope when the absorption coefficient of the embedding medium is know, or the absorption coefficient if the absolute sound level is known is:

$$uI = pC(dT/dt)$$

where $u$ designates the acoustic intensity absorption coefficient per unit path length of the embedding medium, $I$ represents the acoustic intensity, the product $pC$ designates the heat capacity of the embedding medium fluid per unit volume and $(dT/dt)$ indicates the time rate of change of the temperature of the embedding medium at the thermocouple junction at the time of initiation of an acoustic disturbance of rectangular envelope. For thermocouple wires of a diameter of approximately 0.0005 inch, so that the diameter of the junction is of the order of 0.001 inch when the junction is made by lap-welding or soldering, and the beam diameter (at half intensity) is of the order of a few millimeters, it is permissible to identify the quantity $(dT/dt)$ of the above equation with the initial time rate of change of the temperature indicated by the thermocouple. However, in an analysis of the temperature-time response curve and a theoretical evaluation of the probe and the curve, it may be established that the component of temperature change caused by the action of the viscous forces is the mechanism causing the initial non-linear increase in temperature with respect to time and may be readily separated from that resulting from absorption in the body of the medium so that the latter alone may be used to determine either the absolute sound level or the acoustic absorption coefficient and it is unnecessary to develop a precise quantitative analysis of this effect herein.

The time rate of conversion of acoustic energy into heat as a result of the action of the viscous forces is dependent upon the relative orientation of the wire and the particle velocity of the acoustic disturbance in the neighborhood of the wire. Many miscellaneous factors, however, become unimportant when the wire diameters are much smaller than one wave length of the acoustic disturbance. Therefore, the temperature rise resulting from the action of viscous forces reaches an equilibrium state during an early part of the linear rise resulting from acoustic absorption as hereinbefore stated. It, therefore, becomes evident that in accordance with the slope of the second phase of the temperature curve with respect to time, the absolute sound intensity may be established from the law set out hereinabove by substituting that quantity (slope) for $(dT/dt)$, when a rectangular time-to-temperature envelope is employed.

Summarizing, the initial rapid temperature increase phase of the deflection record is the result of the action of viscous forces between the fluid medium and the wire. The second phase of the deflection is the result of temperature change caused by acoustic absorption in the body of the medium and the slope thereof can readily be utilized to yield the absolute sound pressure amplitude and also intensity in a plane wave field, for example.

The almost linear portion of the curve immediately following the initial rapid rise provides an estimate for this slope but since it is difficult to determine when the contribution of the first phase to the deflection can be neglected, a better procedure is to determine the slope of the second phase at a later time such as, for example, 0.5 second. Another important manner of analysis of beam intensities is made by plotting the probe temperature change against the square of the exciting potential for the irradiator 10 or, more conveniently, plotting the deflection of the galvanometer 22 (for instance, in centimeters) against the square of the deflection of the voltmeter 51 which measures the driving voltage applied to the irradiator 10, all values being taken during the time interval when the slope is to be determined for the purpose of finding the absolute sound intensity. Such a chart is illustrated in Figure 5 wherein the ordinate of the graph is ideally proportional to the change of the temperature at the thermocouple junction resulting only from acoustic absorption in the body of the medium in which the thermocouple is embedded and the abscissa is proportional to the square of the transducer driving voltage. Such a curve may be determined for a single transducer or irradiator by driving the same at various levels of excitation. The graph can be used in conjunction with the relation between temperature rise at the thermocouple junction and the deflection of the galvanometer (which is determined by direct measurement), to yield a relation between time rate of change of temperature and transducer driving voltage. The acoustic intensity corresponding to any time rate of change of temperature then follows directly from the equated law given above.

As a specific example of the utilization of the graph of Figure 5 for the establishment of the acoustic intensity, consider a value for the square of the voltmeter deflection of 5.25 volts$^2$, the deflection caused by absorption in the oil is, at this driving level, 0.58 centimeter. Corresponding to this deflection, it may be established that a value of 1.45° C. per second is obtained for the time rate of change of temperature. The heat capacity of the castor oil at 25° C. is 2.02 joules/cm.$^3$ and the acoustic intensity absorption coefficient per unit path length extrapolated from known values is, at 25.0° C. and 980 kilocycles, equal to 0.140 centimeter$^{-1}$. From these values it follows that a value for the acoustic intensity may be determined from the equation given above as 20.9 watts per centimeter$^2$. This is the value of the sound intensity at the thermocouple junction. Since the sound must pass through 2.5 millimeters of castor oil before reaching the junction, in this example, it is computed that the intensity of the sound incident on the probe is obtained by dividing the value just given by 0.965. It then follows that the intensity of the sound incident on the probe is 21.7 watts per centimeter squared.

An important feature of the present invention follows from the geometry of this probe and more particularly from the fact that the thermal junction is small compared to the wave length of the radiated acoustic waves and actually, for the example just considered, is within a range of about 1/10 to about 1/20 of the wave length of the radiated acoustic waves. In accordance with the principles of the present invention, the beam pattern may be determined by moving the thermal junction in the acoustic field or by moving the irradiator with respect to the location of the thermal junction.

From the above analysis of this invention it will also be understood that field patterns and values for acoustic field variables may be determined not only by obtaining the slopes of the temperature rise curve but by merely detecting the output of the thermocouple probe after a selected time interval or the maximum output after a pulse of a given duration.

Thus, it will be evident that numerous variations and modifications in method and apparatus may be made without departing from the true spirit and scope of the novel concepts and principles of this invention. I, therefore, intend to cover all such modifications and variations as fall within the true spirit and scope of the novel concepts and principles of this invention.

I claim as my invention:

1. A method of establishing values for acoustic field variables of an acoustic wave comprising the steps of radiating the acoustic wave energy from a pulsed-on sound source, disposing a temperature-sensing thermocouple probe in said wave field, said probe having a dimension at the junction of its wires not to exceed 0.10 inch whereby conduction along the wires is insignificant with respect to the temperatures to be sensed, and detecting rate of change of temperature in the medium with said probe.

2. A thermal probe comprising a pair of apertured complementary housing members, means to seal said members together against fluid flow therebetween, a pair of membranes closing the apertures in said members, respectively, a thermocouple disposed between the membranes, and leads extending from the thermocouple to without the members.

3. A thermal probe comprising a pair of housing rings, substantially non-reflecting sound wave transmitting membrane members sealed over the apertures in said rings, means sealing said rings together against fluid flow therebetween, a thermocouple supported on one of said rings between the aperture sealing members, and acoustic energy-absorbing means filling the space between said aperture and closing members.

4. A thermal probe comprising a first housing ring having a substantially central aperture therein, a sound-transmitting and substantially nonreflecting membrane covering the central aperture in said ring and sealed thereto, a second housing ring having a substantially central aperture therein, a second membrane covering the aperture in said second housing ring and being substantially sealed thereto, a thermocouple fixed to said second ring, resilient means supporting the thermocouple, means sealing said rings together with said thermocouple disposed between the membranes and substantially parallel thereto, and acoustic energy-absorbing means surrounding said thermocouple and filling space between said membranes.

5. Apparatus for determining physical parameters of a high frequency acoustical field at selected points within a first medium, comprising a probe including a thermocouple embedded in a medium acoustically matched with said first medium, said thermocouple at its thermal junction having a diameter not exceeding 0.01 inch whereby conduction along the probe is insignificant with respect to the temperatures to be observed by the thermocouple, and means operatively associated with the thermocouple for measuring the rate of change of temperature indicated by the thermocouple.

6. Apparatus as set forth in claim 5 in which the thermocouple at its thermal junction has a dimension of approximately .001 inch.

References Cited in the file of this patent

UNITED STATES PATENTS

| | | |
|---|---|---|
| 2,052,952 | Thomas | Sept. 1, 1936 |
| 2,405,210 | Inglis | Aug. 6, 1946 |
| 2,420,676 | Peterson | May 20, 1947 |
| 2,531,844 | Fiedler | Nov. 28, 1950 |
| 2,580,439 | Koch | Jan. 1, 1952 |
| 2,803,128 | Petermann | Aug. 20, 1957 |

OTHER REFERENCES

Morita: "Sonde Method of Measuring the Ultrasonic Field Intensity," Journal of the Physical Society of Japan, vol. 7, No. 2, March–April 1952, pages 214—219.

Fry et al.: "Temperature Changes Produced in Tissue During Ultrasonic Irradiation," Journal of Acoustical Soc. of America, vol. 25, No. 1, January 1953, pages 6–11 (pages 6–7 relied on).

Palmer: "A Thermoelectric Method of Comparing Intensities of Ultrasonic Fields in Liquids," Journal of Scientific Instruments, vol. 30, June 1953, pages 177–179.